(12) United States Patent
Kihara et al.

(10) Patent No.: US 8,118,349 B2
(45) Date of Patent: Feb. 21, 2012

(54) VEHICLE BODY FRONT PART STRUCTURE

(75) Inventors: Makoto Kihara, Wako (JP); Shigeto Yasuhara, Wako (JP); Shinichi Yoshikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 12/616,307

(22) Filed: Nov. 11, 2009

(65) Prior Publication Data

US 2010/0117403 A1 May 13, 2010

(30) Foreign Application Priority Data

Nov. 12, 2008 (JP) ................................. 2008-289733

(51) Int. Cl.
*B62D 23/00* (2006.01)

(52) U.S. Cl. ......... 296/187.09; 296/193.09; 296/203.02; 296/205

(58) Field of Classification Search ............. 296/187.09, 296/187.1, 193.09, 203.02, 205, 29
See application file for complete search history.

(56) References Cited

U.S. PATENT DOCUMENTS

| 7,264,301 | B2 | 9/2007 | Yasuhara | |
| 7,556,310 | B2 * | 7/2009 | Miki | 296/204 |
| 7,641,270 | B2 * | 1/2010 | Takeda | 296/203.02 |
| 7,815,245 | B2 * | 10/2010 | Hiraishi et al. | 296/187.09 |
| 7,845,716 | B2 * | 12/2010 | Kiyotake et al. | 296/203.02 |
| 8,002,337 | B2 * | 8/2011 | Baccouche et al. | 296/203.02 |
| 2006/0232104 | A1 * | 10/2006 | Yasuhara | 296/187.05 |

FOREIGN PATENT DOCUMENTS

| EP | 1897787 | 3/2008 |
| JP | 60-13866 | 1/1985 |
| JP | 1-145884 | 10/1989 |
| JP | 08-085472 | 4/1996 |
| JP | 2006-290311 | 10/2006 |
| JP | 2007-112260 | 5/2007 |
| JP | 2008-062760 | 3/2008 |
| JP | 2008-213562 | 9/2008 |

* cited by examiner

*Primary Examiner* — Glenn Dayoan
*Assistant Examiner* — Gregory Blankenship
(74) *Attorney, Agent, or Firm* — Rankin, Hill & Clark LLP

(57) ABSTRACT

A vehicle body front part structure having a front side frame including a compressive load bearing frame member extending longitudinally of a vehicle body, and a bending load bearing frame member branched from a longitudinally central portion of the compressive load bearing frame member and curved inwardly toward a longitudinal centerline of the vehicle body as extending rearwardly of the vehicle body. The compressive load bearing frame member has a rear end portion curved inwardly toward the longitudinal centerline of the vehicle body, and reinforcement beads formed on a sidewall of the rear end portion of the compressive load bearing frame member.

11 Claims, 11 Drawing Sheets

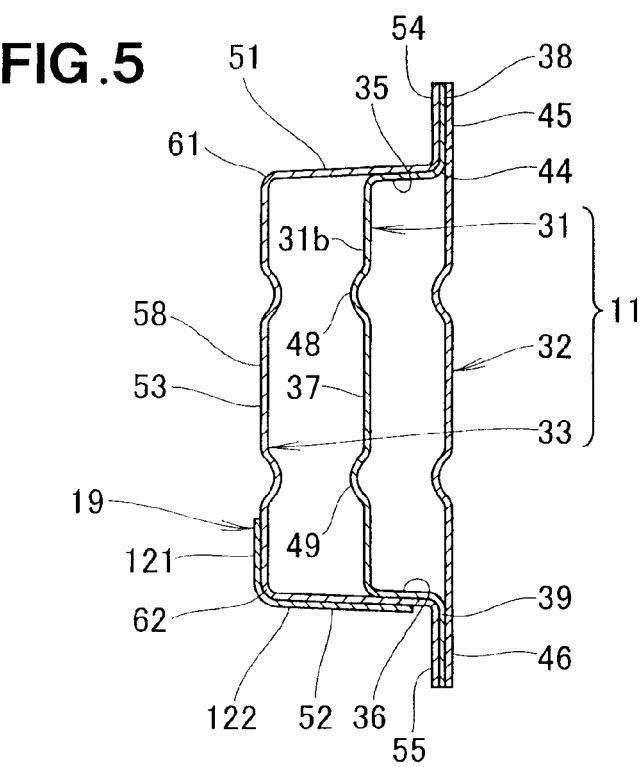
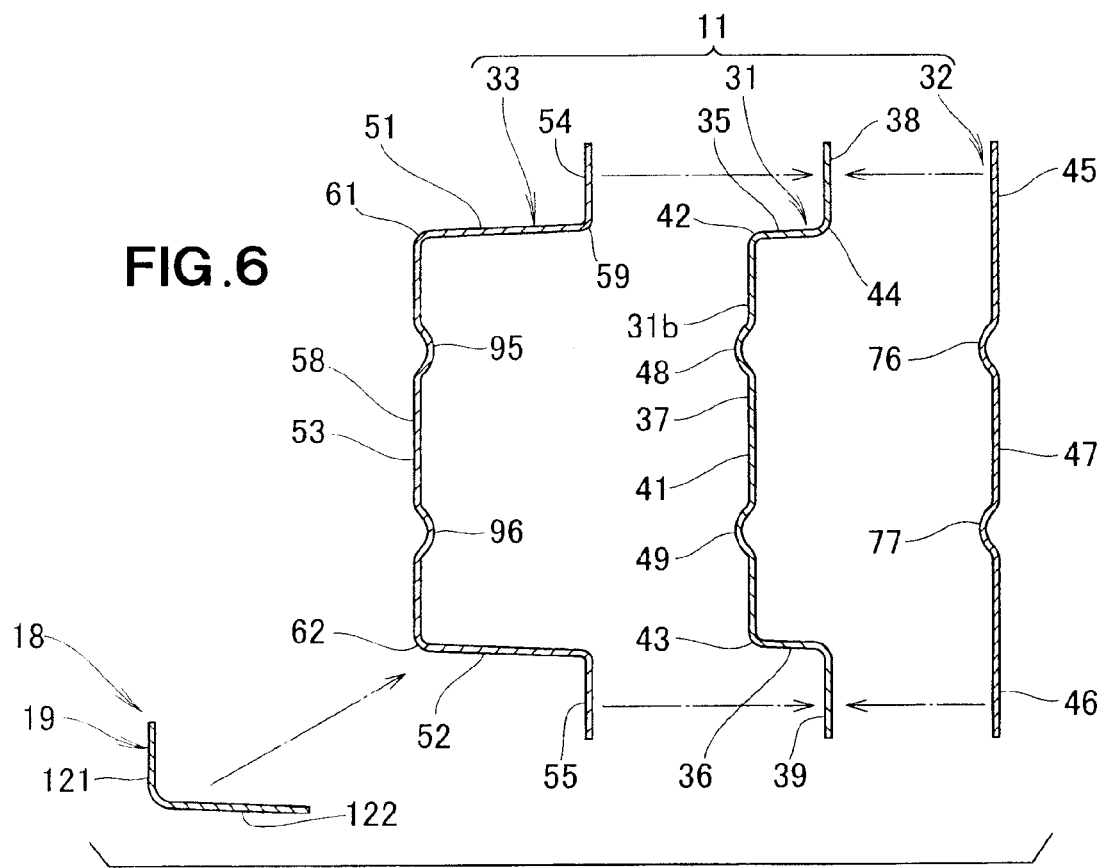

VEHICLE BODY FRONT PART STRUCTURE

FIELD OF THE INVENTION

The present invention relates to a front part structure of an automobile vehicle body including a pair of right and left front side frames each having a compressive load bearing frame member for supporting an axial load acting in a longitudinal direction of the vehicle body.

BACKGROUND OF THE INVENTION

Various vehicle body front part structures of the type concerned are known and used heretofore. According to one example shown in Japanese Patent Laid-open Publication (JP-A) No. 2006-290311, a vehicle body front part structure includes a pair of right and left front side frames as main components thereof, and each of the right and left front side frames has an axial load receiving member (hereinafter referred to as "compressive load bearing frame member") extending in a longitudinal direction of the vehicle body, and a moment receiving member (hereinafter referred to as "bending load bearing frame member") curved inwardly of the vehicle body as extending rearwardly of the vehicle body.

According to the vehicle body front part structure shown in JP 2006-290311 A), the compressive load bearing frame member configured to extend in the longitudinal direction of the vehicle body is able to bear or sustain a load acting in a direction from the front toward the rear of the vehicle body. Furthermore, the bending load bearing frame member branched from a longitudinally central portion of the compressive load bearing frame member and curved inwardly of the vehicle body as extending rearwardly of the vehicle body is able to bear or sustain a load acting in a lateral or widthwise inward direction of the vehicle body.

The compressive load bearing frame member has a rear end portion connected or joined to a front end portion of a floor frame. In the case where the floor frame is offset relative to the compressive load bearing frame member in a lateral inward direction of the vehicle body, the rear end portion of the compressive load bearing frame member is curved inwardly of the vehicle body for connection or joining with the front end portion of the floor frame. The thus curved rear end portion of the compressive load bearing frame member has a rigidity, which is insufficient to sustain an axial load acting in the longitudinal direction of the vehicle body. Accordingly, when the front side frame is subjected to a front collision input, the compressive load bearing frame member as a whole is rendered practically impossible to sustain an axial load resulting from the front collision input.

It is accordingly an object of the present invention to provide a vehicle body front part structure including a front side frame having a compressive load bearing frame member which is connectable to a floor frame and has a rigidity sufficient to sustain an axial load acting thereto during a front collision even when the floor frame is offset from the compressive load bearing frame member toward a longitudinal centerline of the vehicle body.

SUMMARY OF THE INVENTION

According to the present invention, there is provided a front part structure of a vehicle body having a pair of right and left side frames, each of the front side frames comprising: a compressive load bearing frame member extending in a longitudinal direction of the vehicle body and having a generally U-shaped cross section opening in a lateral inward direction or a lateral outward direction of the vehicle body, the compressive load bearing frame member of the U-shaped cross section having a pair of upper and lower walls and a sidewall extending between the upper and lower walls; and a bending load bearing frame member branched from a longitudinally central portion of the compressive load bearing frame member and curved inwardly toward a longitudinal centerline of the vehicle body as extending rearwardly of the vehicle body, the bending load bearing frame member having a generally U-shaped cross section opening in the lateral inward direction or the lateral outward direction of the vehicle body, wherein the compressive load bearing frame member has a rear end portion curved inwardly toward the longitudinal centerline of the vehicle body, and at least one first reinforcement bead formed on the sidewall of the rear end portion of the compressive load bearing frame member and extending in the longitudinal direction of the vehicle body.

With this arrangement, since the rear end portion of the compressive load bearing frame member is curved inwardly toward the longitudinal centerline of the vehicle body, it is readily possible to connect the rear end portion of the compressive load bearing frame member to a floor frame even when the floor frame is offset toward the longitudinal centerlines of the vehicle body with respect to the compressive load bearing frame member. Furthermore, by virtue of the reinforcement bead formed on the sidewall of the inwardly curved rear end portion of the compressive load bearing frame member, the inwardly curved rear end portion becomes highly rigid enough to withstand an axial load applied thereto.

The compressive load bearing frame member may further have at least one second reinforcement bead formed on a portion of the sidewall located forwardly of the longitudinal central portion of the compressive load bearing frame member, the second reinforcement bead extending in the longitudinal direction of the vehicle body. The second reinforcement bead further increases the rigidity of the compressive load bearing frame member.

Preferably, each of the front side frames further comprises a cover frame member connected to the compressive load bearing frame member so as to close an open end of the U-shaped cross section of the compressive load bearing frame member to thereby form a closed cross section between the cover frame member and the compressive load bearing frame member, and wherein the cover frame member has at least one third reinforcement bead arranged face to face with the first reinforcement bead. In an assembled condition, a closed cross section is formed between the cover frame member and the compressive load bearing frame member, the rigidity of the compressive load bearing frame member increases further. Furthermore, the face-to-face arrangement of first and third reinforcement beads further increases the rigidity of the inwardly curved rear end portion of the compressive load bearing frame member.

The bending load bearing frame member of the U-shaped cross section may further have at least one fourth reinforcement bead formed on a sidewall thereof and extending in the longitudinal direction of the vehicle body. Preferably, the first reinforcement bead and the fourth reinforcement bead are arranged face to face with each other. By thus providing the fourth reinforcement bead, it is possible to increase the rigidity of the bending load bearing frame member and hence reduce an extent to which the inwardly curved bending load bearing frame portion projects in a direction toward the longitudinal centerline of the vehicle body. By thus reducing the inwardly projecting extent or amount of the bending load bearing frame member, it is possible to enlarge an internal space of the engine room, which will provide an increased degree of design freedom. The bending load bearing frame member having a reduced inwardly projecting amount achieves a reduction in weight of the vehicle body front part structure.

In one preferred form of the invention, the vehicle body front part structure further includes a floor frame having a front end portion connected to a rear end portion of each of the front side frames, wherein the rear end portion of the compressive load bearing frame member is downwardly curved, and said at least one first reinforcement bead comprises a pair of upper and lower first reinforcement beads extending obliquely downward toward the front end portion of the floor frame and longitudinally aligned with upper and lower ends, respectively, of the front end portion of the floor frame. Preferably, the lower first reinforcement bead has an angle of inclination greater than an angle of inclination of the upper first reinforcement bead. The cover frame member has a pair of upper and lower third reinforcement beads arranged face to face with the pair of upper and lower first reinforcement beads, respectively. The bending load bearing frame member has a pair of upper and lower fourth reinforcement beads formed on the sidewall thereof in face to face arrangement with the pair of upper end lower first reinforcement beads on the compressive load bearing frame member. This arrangement provides a highly efficient reinforcement to the curved rear end portion of the compressive load bearing frame member.

Preferably, the vehicle body front part structure includes an adapter disposed on a rear end portion of each of the front side frames, and a floor frame having a front end portion connected via the adapter to the rear end portion of each of the front side frames. The adapter increases the coupling strength between the front side frame and the floor frame.

The vehicle body front part structure may further include a sub-frame disposed below the front side frames and connected to the front side frames, and a stiffener disposed on each of the front side frame to reinforce a portion of the front side frame to which the sub-frame is connected.

BRIEF DESCRIPTION OF THE DRAWINGS

One preferred structural embodiment of the present invention will be described in detail below, by way of example only, with reference to the accompanying sheets of drawings, in which:

FIG. 5 is a cross-sectional view taken along line 5-5 of FIG. 3;

FIG. 6 is an exploded cross-sectional view of the front side frame shown in FIG. 5;

DETAILED DESCRIPTION OF THE PREFERRED EMBODIMENT

Figure 1:
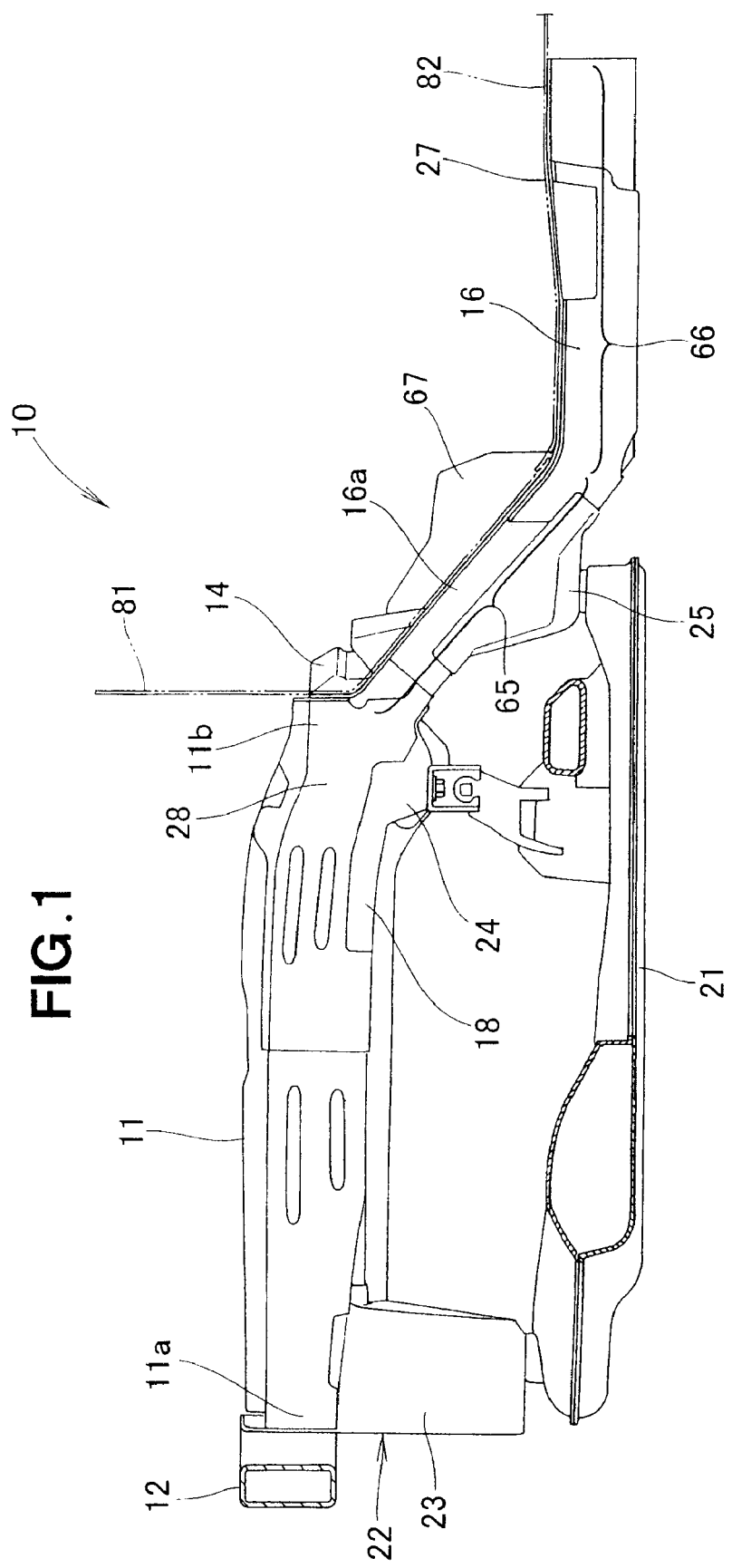
FIG. 1 is a side view of a vehicle body front part structure according to a preferred embodiment of the present invention.
Figure 2:
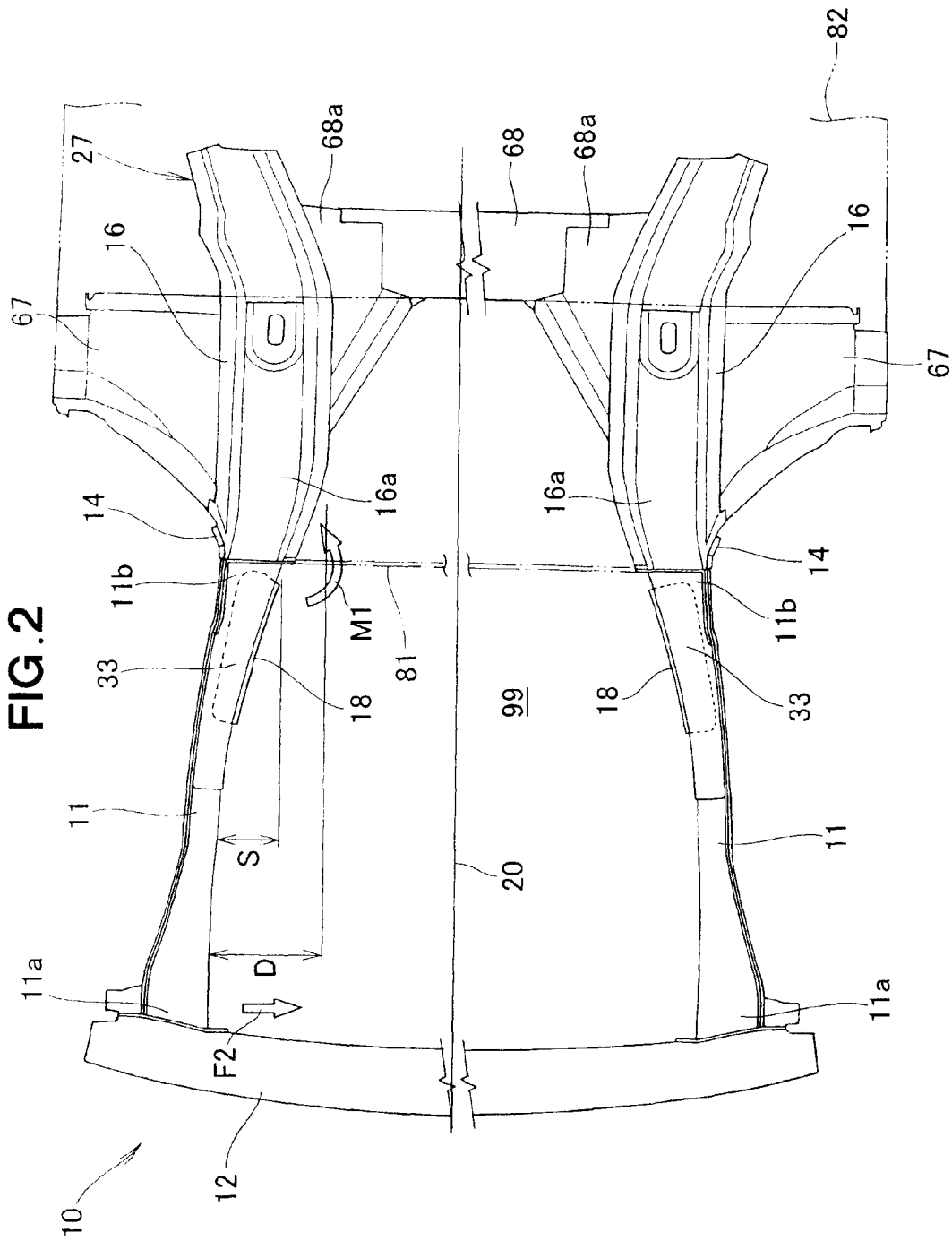
FIG. 2 is a plan view, with parts omitted for clarity, of the vehicle body front part structure.

Referring now to the drawings and FIGS. 1 and 2 in particular, there is shown a vehicle body front part structure 10 according to a preferred embodiment of the present invention. The vehicle body front part structure 10 generally comprises a pair of right and left front side frames 11, 11 extending in a longitudinal direction of the vehicle body, a bumper beam 12 connected to front end portions 11a, 11a of the front side frames 11, 11 and extending in a widthwise direction of the vehicle body, a pair of right and left adapters 14, 14 disposed at rear end portions 11b, 11b of the right and left front side frames 11, 11, respectively, a pair of right and left floor frames 16, 16 connected via the adapters 14, 14 to the rear end portions 11b, 11b of the right and left front side frames 11, 11, respectively, a pair of right and left stiffeners 18, 18 for reinforcing the right and left front side frames 11, 11, respectively, and a sub-frame 21 disposed below the right and left front side frames 11, 11. In FIG. 2, the sub-frame 21 is not shown for clarity.

As shown in FIG. 1, the sub-frame 21 is connected to the right and left front side frames 11 and the right and left floor frames 16 via a sub-frame attachment means 22. The sub-frame attachment means 22 includes a pair of right and left front sub-frame attachment members 23 (only the right member being shown) extending vertically downward from the front end portions 11a of the front side frames 11, a pair of right and left central sub-frame attachment members 24 (only the right member being shown) provided on the rear end portions 11b of the front side frames 11, and a pair of right and left rear sub-frame attachment members 25 (only the right member being shown) provided on front end portions 16a of the floor frames 16.

The right front, central and rear sub-frame attachment members 23, 24 and 25 and the left front, central and rear sub-frame attachment members 23, 24 and 25 are symmetrical with each other about a longitudinal centerline 20 (FIG. 2) of the vehicle body, and only the right attachment members 23-25 are shown in FIG. 1. The sub-frame 21 is attached to the right and left front sub-frame attachment members 23, the right and left central sub-frame attachment members 24, and the right and left rear sub-frame attachment members 25, so that the sub-frame 21 is supported below the right and left front side frames 11 by the sub-frame attachment means 22.

The central sub-frame attachment members 24 are provided on the stiffeners 18, respectively. The stiffeners 18 are members that are provided to reinforce the associated front side frames 11.

The right and left front side frames 11, the right and left adapters 14, the right and left floor frames 16, and right and left stiffeners 18 in each pair are symmetrical with each other along the longitudinal centerline 20 (FIG. 2) of the vehicle body and the following description will be limited to those members 11, 14, 16 and 18 which are disposed on the right-side of the vehicle body.

Figure 3:
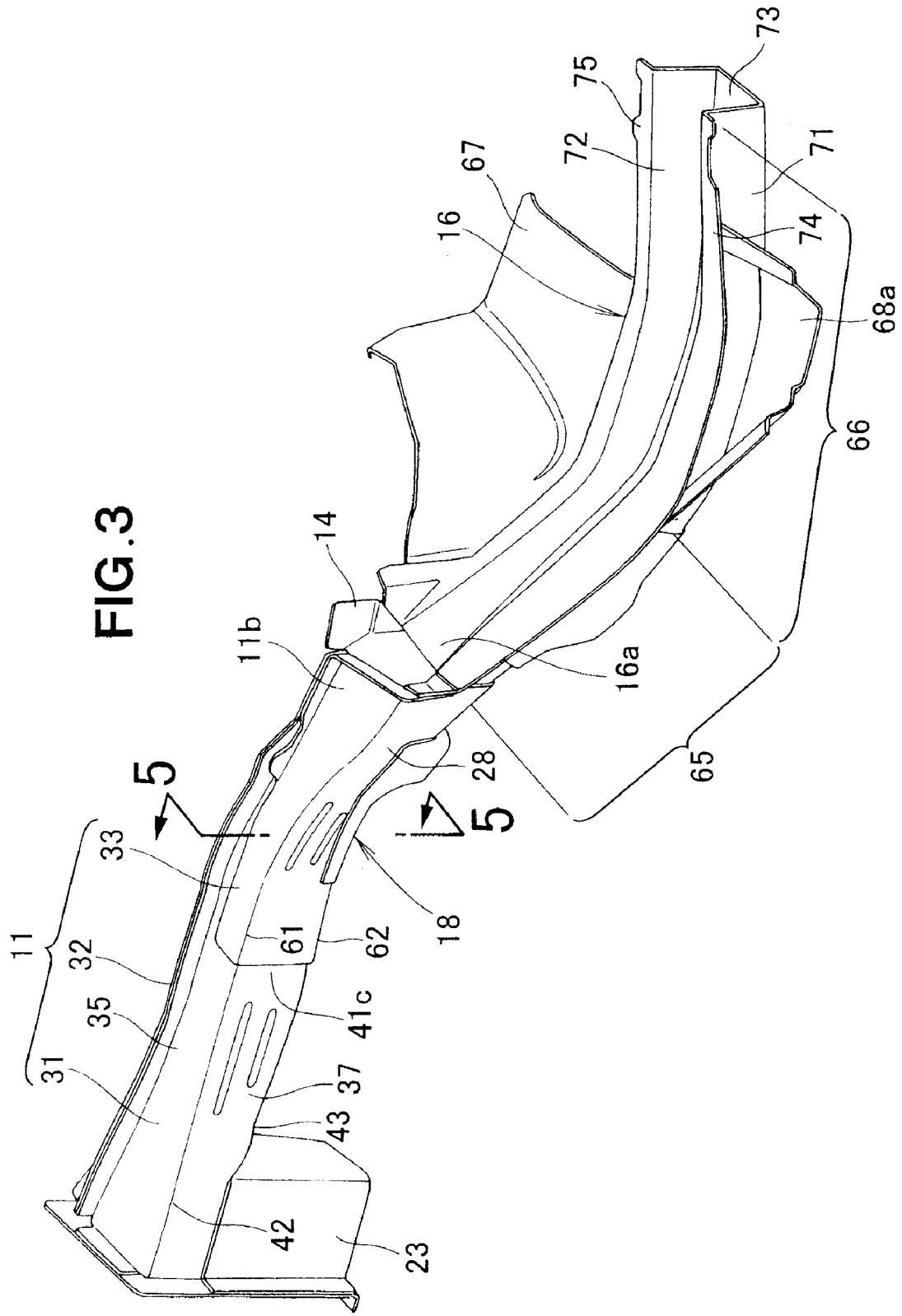
FIG. 3 is a perspective view of a right front side frame and a right floor frame of the vehicle body front part structure.

As shown in FIG. 3, the right front side frame 11 is a main or skeletal component of the vehicle body front part structure 10 and generally comprises a compressive load bearing frame member 31 extending in the longitudinal direction of the vehicle body, a cover frame member 32 disposed on a lateral outer side of the compressive load bearing frame member 31, and a bending load bearing frame member 33 disposed on a lateral inner side of the compressive load bearing frame member 31. The right front side frame 11 has a downwardly curved portion 28 formed at a rear end part thereof. The downwardly curved portion 28 is configured to curve in a downward direction toward the right floor frame 16 so that the rear end portion 11b of the right front side frame 11 can be connected to the right floor frame 16 via the right adapter 14.

Figure 4:
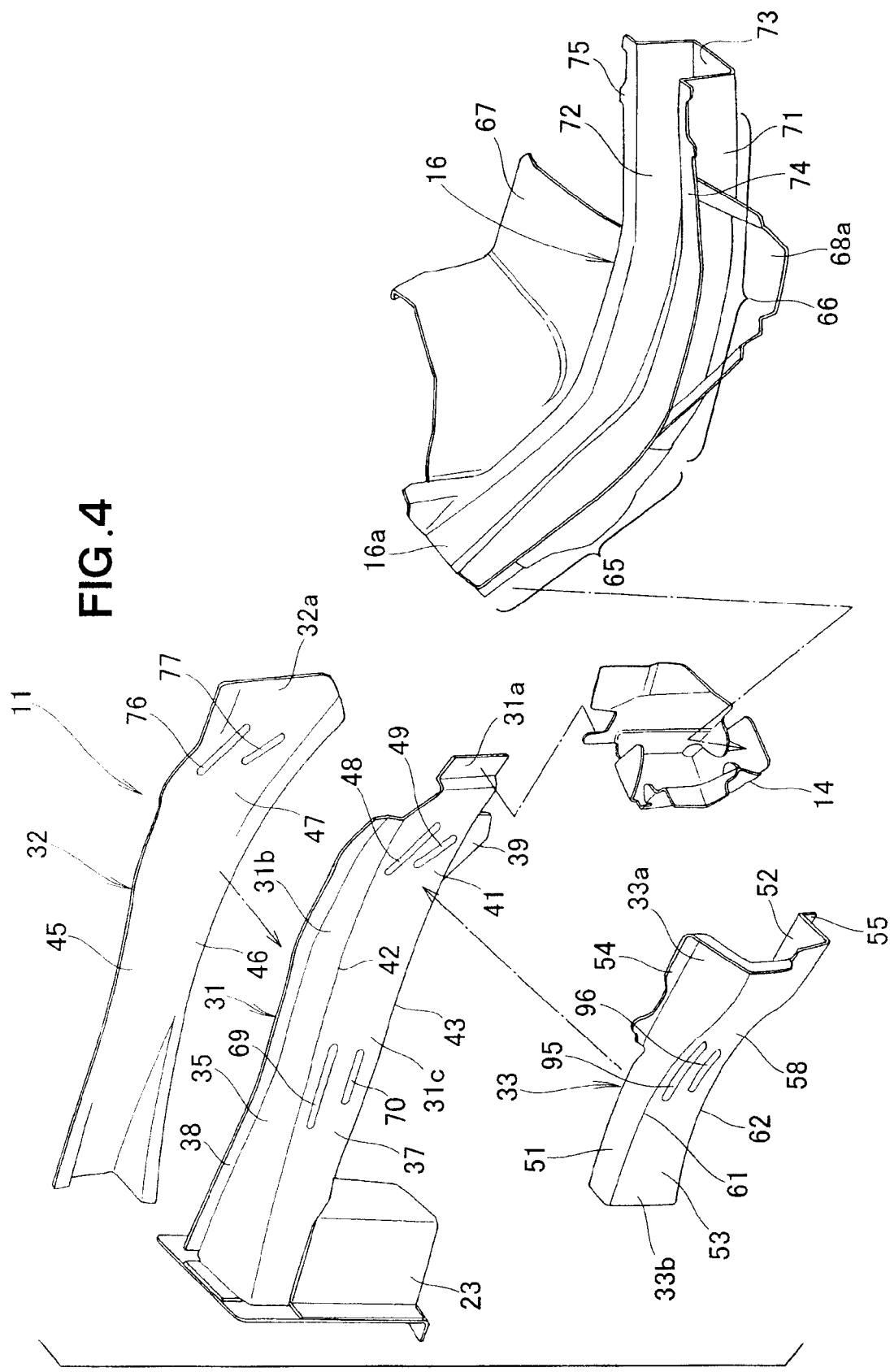
FIG. 4 is an exploded perspective view of FIG. 3.

Referring next to FIGS. 4 to 6, structural details of the right front side frame 11 will be described. The compressive load bearing frame member 31 extends in the longitudinal direction of the vehicle body, as described above. As shown in FIG. 5, the compressive load bearing frame member 31 has a generally U-shaped cross section opening in a lateral or widthwise outward direction of the vehicle body and having an upper wall 35, a lower wall 36 and a sidewall 37 extending vertically between the upper and lower walls 35 and 36. The compressive load bearing frame member 31 further has an upper vertical flange 38 extending upwardly from a longitudinal edge of the upper wall 35, and a lower vertical flange 39 extending downwardly from a longitudinal edge of the lower wall 36.

As shown in FIG. 4, the compressive load bearing frame member 31 has a downwardly curved portion 41 at a rear end part thereof, and a pair of vertically spaced reinforcement beads 48 and 49 formed on the downwardly curved portion 41. The downwardly curved portion 41 is configured to curve in a downward direction toward the front end portion 16a of the right floor frame 16. With the downwardly curved portion 41 thus provided, a rear end portion 31a of the compressive load bearing frame member 31 can be connected via the right adapter 14 to the front end portion 16a of the right floor frame 16.

The compressive load bearing frame member 31 has an upper ridge line 42 formed by the upper wall 35 and the sidewall 37 and a lower ridge line 43 formed by the lower wall 36 and the sidewall 37. As shown in FIG. 4, the upper and lower ridge lines 42, 43 extend in the longitudinal direction of the vehicle body, so that an axial load acting in a direction from the front to the rear of the vehicle body can be born or sustained by the compressive load bearing frame member 31 (and, more particularly, by the upper and lower ridges 42, 43 of the compressive load bearing frame member 31). The compressive load bearing frame member 31 may be also referred to as an axial load receiving member that receives the axial load acting in a front-to-rear direction of the vehicle.

The reinforcement beads 48, 49 are provided on the downwardly curved portion 41 of the compressive load bearing frame member 31 for a reason discussed below. As shown in FIG. 2, with respect to the compressive load bearing frame member 31, the right floor frame 16 is offset in a lateral inward direction toward the longitudinal centerline 20 of the vehicle body by a distance D. In view of this, as shown in FIG. 7, the downwardly curved portion (rear end portion) 41 of the compressive load bearing frame member 31 is inwardly curved toward the longitudinal centerline 20 of the vehicle body so that the curved rear end portion 41 can be connected to the right floor frame 16.

More concretely, the downwardly curved portion 41 of the compressive load bearing frame member 31 is slightly curved toward the longitudinal centerline 20 (FIG. 2) with a radius of R. By thus forming the downwardly curved portion 41 of the compressive load bearing frame member 31, the rear end portion 31a of the compressive load bearing frame member 31 can be connected via the right adapter 14 to the front end portion 16a of the right floor frame 16 shown in FIG. 4.

However, by thus curving the downwardly curved portion 41 of the compressive load bearing frame member 31 toward the longitudinal centerline 20 (FIG. 2) of the vehicle body, it becomes difficult for the downwardly curved portion 41 to maintain a sufficient rigidity against an axial load acting in a direction from the front to the rear of the vehicle body. To deal with this problem, the reinforcement beads 48, 49 are provided on the downwardly curved portion 41 (FIG. 4).

Figure 7:
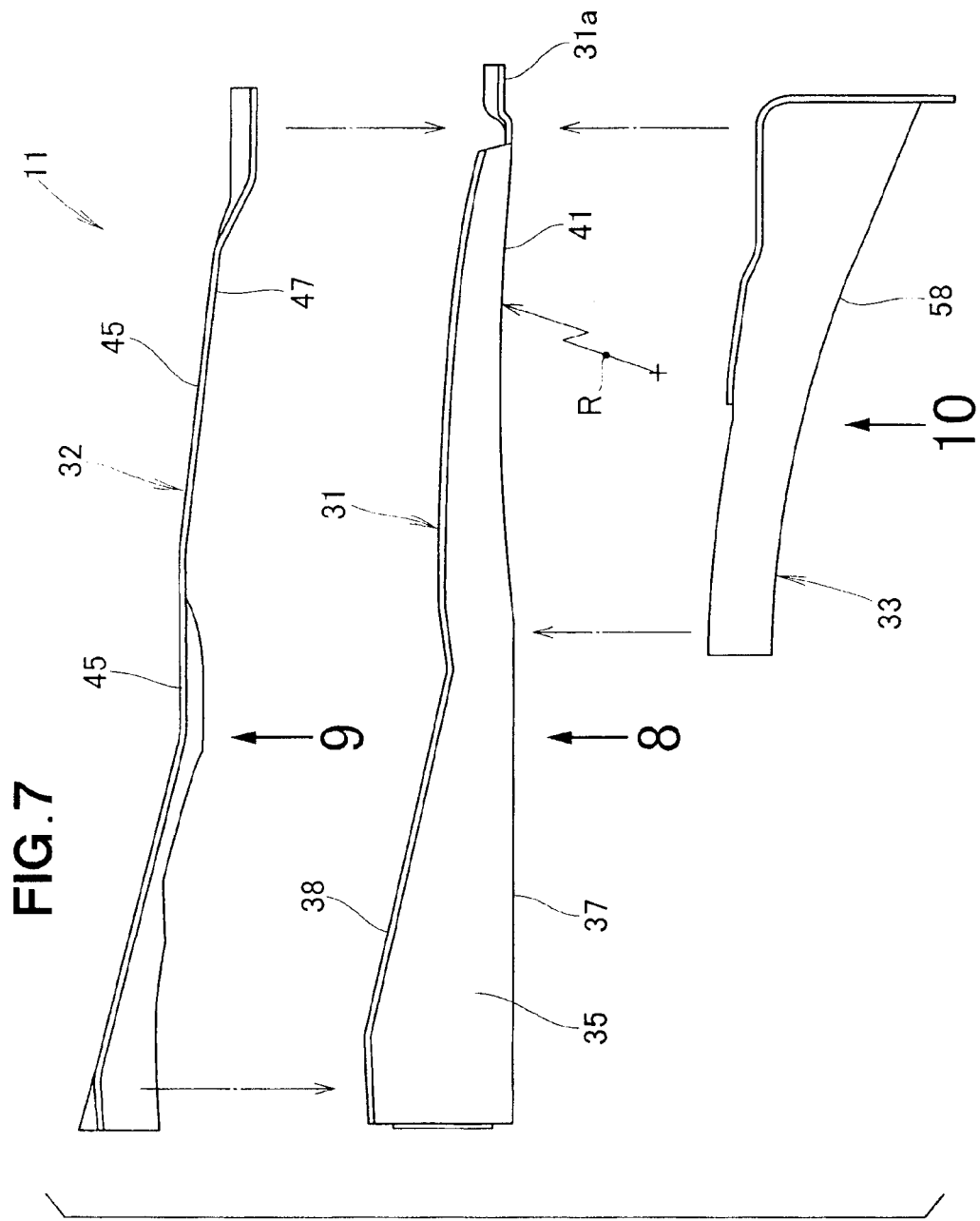
FIG. 7 is an exploded plan view of the front side frame.
Figure 8:
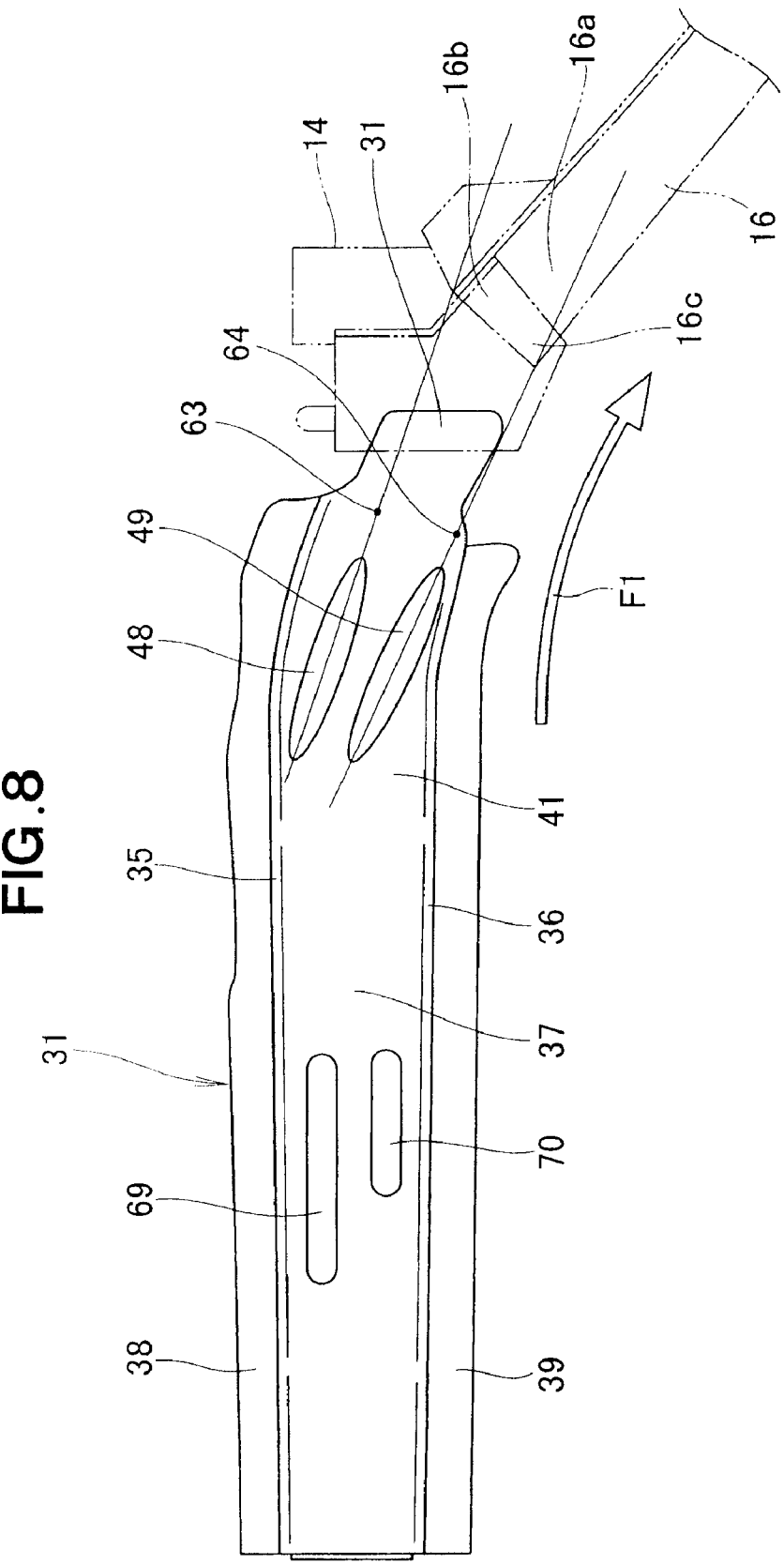
FIG. 8 is a view in the direction of the arrow 8 in FIG. 7.

As shown in FIG. 8 which is a view in the direction of the arrow 8 in FIG. 7, the upper reinforcement bead 48 is disposed on the sidewall 37 of the downwardly curved portion 41 adjacent to the upper wall 35 and formed to extend along an upper oblique line 63, which extends obliquely downward in a rearward direction of the vehicle body. The upper oblique line 63 is set to pass through an upper end 16b of the front end portion 16a of the right floor frame 16. Thus, the upper reinforcement bead 48 extends obliquely downward toward the front end portion 16a of the floor frame 16 and is longitudinally aligned with the upper end 16b of the front end portion 16a of the right floor frame 16. As shown in FIG. 5, the upper reinforcement bead 48 projects toward the longitudinal centerline 20 (FIG. 2) of the vehicle body.

The lower reinforcement bead 49 is disposed on the sidewall 37 of the downwardly curved portion 41 adjacent to the lower wall 36 and formed to extend along a lower oblique line 64, which extends obliquely downward in a rearward direction of the vehicle body. The lower oblique line 64 is set to pass through a lower end 16c of the front end portion 16a of the right floor frame 16 and has an angle of inclination which is larger than an angle of inclination of the upper oblique line 63. Thus, the lower reinforcement bead 49 extends obliquely downward toward the front end portion 16a of the floor frame 16 and is longitudinally aligned with the lower end 16c of the front end portion 16a of the right floor frame 16. The lower reinforcement bead 49 has a larger angle of inclination than the upper reinforcement bead 48. As shown in FIG. 5, the lower reinforcement bead 49 also projects toward the longitudinal centerline 20 (FIG. 2) of the vehicle body.

With this arrangement, when the downwardly curved portion 41 is subjected to a load F1 acting from the front of the vehicle body, the load F1 is transmitted from the downwardly curved portion 41 of the compressive load bearing frame member 31 to the right floor frame 16 as indicated by the arrow F1 shown in FIG. 8. Since the upper reinforcement bead 48 is longitudinally aligned with the upper end 16b of the front end portion 16a of the floor frame 16 and the lower reinforcement bead 49 is longitudinally aligned with the lower end 16c of the front end portion 16a of the floor frame 16 (namely, because the upper and lower reinforcement beads 48, 49 are longitudinally aligned with the front end portion 16a of the floor frame 16), the upper end lower reinforcement beads 48, 49 extend along a transfer direction of the load F1. With the reinforcement beads 48, 49 thus provided, the downwardly curved portion 41 now possesses a rigidity, which is large enough to sustain the load F1.

The compressive load bearing frame member 31 further has another pair of vertically spaced reinforcement beads 69 and 70 formed on the sidewall 37 at a portion located forwardly of the downwardly curved portion 41. In the illustrated embodiment, the reinforcement beads 69, 70 are located forwardly of the longitudinally central portion 31c of the compressive load bearing frame member 31. The upper reinforcement bead 69 extends substantially horizontally along the longitudinal direction of the compressive load bearing frame member 31 and projects toward the longitudinal centerline 20 (FIG. 2) in the same manner as the upper reinforcement bead 48. The lower reinforcement bead 70 is disposed below the upper reinforcement bead 69 and extends substantially horizontally along the longitudinal direction of the compressive load bearing frame member 31. Like the lower reinforcement bead 49, the lower reinforcement bead 70 projects toward the longitudinal centerline 20 (FIG. 2) of the vehicle body. The upper and lower reinforcement beads

69, 70 further increase the rigidity of the compressive load bearing frame member 31 against the load F1 acting from the front of the vehicle body.

Referring back to FIGS. 4 to 6, the cover frame member 32 is an elongated strip-like plate member extending in the longitudinal direction of the vehicle body. The cover frame member 32 has an upper longitudinal edge portion 45 welded to the upper vertical flange 38 of the compressive load bearing frame member 31, and a lower longitudinal edge portion 46 welded to the lower vertical flange 39 of the compressive load bearing frame member 31. By thus welding the cover frame member 32 to the compressive load bearing frame member 31, an open end 44 (FIGS. 5 and 6) of the U-shaped cross section of the compressive load bearing frame member 31 is closed by the cover frame member 32, and a closed cross section is formed by and between the cover frame member 32 and the compressive load bearing frame member 31.

The cover frame member 32 has a downwardly curved portion 47 (FIG. 4) at a rear end part thereof, and a pair of vertically spaced outer reinforcement beads 76 and 77 formed on the downwardly curved portion 47. The downwardly curved portion 47 is configured to curve in a downward direction toward the front end portion 16a of the right floor frame 16. With the downwardly curved portion 47 thus provided, a rear end portion 32a of the cover frame member 32 can be connected via the right adapter 14 to the front end portion 16a of the right floor frame 16.

Figure 9:
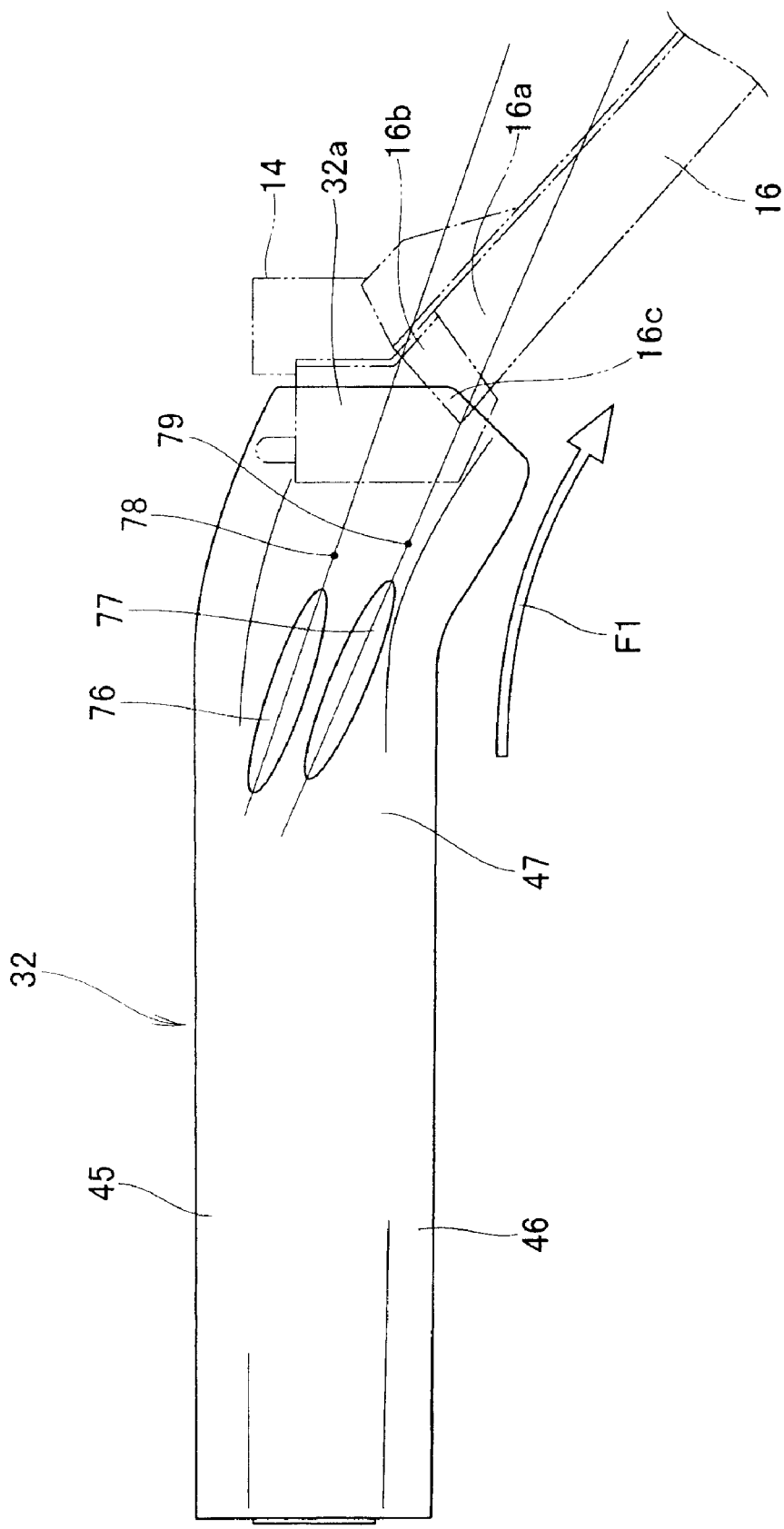
FIG. 9 is a view in the direction of the arrow 9 in FIG. 7.

As shown in FIG. 9 which is a view in the direction of the arrow 9 in FIG. 7, the upper outer reinforcement bead 76 is disposed on a substantially central part of the downwardly curved portion 47 adjacent to the upper longitudinal edge portion 45 of the cover frame member 32 and formed to extend along an upper oblique line 78, which extends obliquely downward in a rearward direction of the vehicle body. The upper outer reinforcement bead 76 is arranged face to face with the upper reinforcement bead 48 (FIG. 8) in the lateral or widthwise direction of the vehicle body (see FIG. 5). The upper oblique line 78 is set to pass through the upper end 16b of the front end portion 16a of the right floor frame 16. Thus, the upper outer reinforcement bead 76 extends obliquely downward toward the front end portion 16a of the right floor frame 16 and is longitudinally aligned with the upper end 16b of the front end portion 16a of the right floor frame 16. As shown in FIG. 5, the upper outer reinforcement bead 76 projects toward the longitudinal centerline 20 (FIG. 2) of the vehicle body.

The lower outer reinforcement bead 77 is disposed on a substantially central part of the downwardly curved portion 47 adjacent to the lower longitudinal edge portion 46 of the cover frame member 32 and formed to extend along a lower oblique line 79, which extends obliquely downward in a rearward direction of the vehicle body. The lower outer reinforcement bead 77 is arranged face to face with the lower reinforcement bead 49 (FIG. 8) in the lateral or widthwise direction of the vehicle body (see FIG. 5). The lower oblique line 79 is set to pass through the lower end 16c of the front end portion 16a of the right floor frame 16 and has an angle of inclination larger than that of the upper oblique line 78. Thus, the lower outer reinforcement bead 77 extends obliquely downward toward the front end portion 16a of the right floor frame 16 and is longitudinally aligned with the lower end 16c of the front end portion 16a of the right floor frame 16. As shown in FIG. 5, the lower outer reinforcement bead 77 also projects toward the longitudinal centerline 20 (FIG. 2) of the vehicle body.

With this arrangement, when the cover frame member 32 is subjected to a load F1 acting from the front of the vehicle body, the load F1 is transmitted to the right floor frame 16 as indicated by the arrow F1 shown in FIG. 7. Since the upper outer reinforcement bead 76 is longitudinally aligned with the upper end 16b of the front end portion 16a of the floor frame 16 and the lower outer reinforcement bead 77 is longitudinally aligned with the lower end 16c of the front end portion 16a of the floor frame 16 (namely, because the upper and lower outer reinforcement beads 76, 77 are longitudinally aligned with the front end portion 16a of the floor frame 16), the upper and lower outer reinforcement beads 76, 77 extend along a transfer direction of the load F1. By thus providing the outer reinforcement beads 76, 77 on the downwardly curved portion 47, the cover frame member 32 is highly rigid to withstand the load F1.

The thus reinforced cover frame member 32 is welded to the compressive load bearing frame member 31 (FIG. 8) so as to close the open end 44 of the U-shaped cross section of the compressive load bearing frame member 31, and a closed cross section is formed by and between the cover frame member 32 and the compressive load bearing frame member 31, as shown in FIG. 5. With this arrangement, the downwardly curved portion 47 of the cover frame member 32 that is reinforced with the outer reinforcement beads 76, 77 further increases the rigidity of the downwardly curved portion 41 of the compressive load bearing frame member 31.

Referring back to FIGS. 4 to 6, structural details of the bending load bearing frame member 33 will be described. The bending load bearing frame member 33 has a generally U-shaped cross section opening in a lateral or widthwise outward direction of the vehicle body and having an upper wall 51, a lower wall 52 (FIGS. 5 and 6) and a sidewall 53 extending vertically between the upper and lower wails 51 and 52. The bending load bearing frame member 33 further has an upper vertical flange 54 extending upwardly from a longitudinal edge of the upper wall 51, and a lower vertical flange 55 extending downwardly from a longitudinal edge of the lower wall 52.

As shown in FIG. 6, the right stiffener 18 formed from an angle plate 19 of an L-shaped cross section having a vertical wall 121 joined by welding to the sidewall 53 of the bending load bearing frame member 33 and a horizontal wall 122 joined by welding to the lower wall 52 of the bending load bearing frame member 33. The thus welded stiffener 18 reinforces a portion of the front side frame 11 to which the sub-frame 21 (FIG. 1) is attached.

As shown in FIG. 4, the bending load bearing frame member 33 has a downwardly curved portion 48 at a rear end part thereof, and a pair of vertically spaced inner reinforcement beads 95 and 96 formed on the downwardly curved portion 48. The downwardly curved portion 48 is configured to curve in a downward direction toward the front end portion 16a of the right floor frame 16. With the downwardly curved portion 48 thus provided, a rear end portion 33a of the bending load bearing frame member 33 can be connected via the right adapter 14 to the front end portion 16a of the right floor frame 16.

The bending load bearing frame member 33 is wrapped over a rear longitudinal half or section 31b of the compressive load bearing frame member 31 and welded to the compressive load bearing frame member 31. In the welded or assembled condition, an open end 59 of the U-shaped cross section of the bending load bearing frame member 33 is closed by and between the compressive load bearing frame member 31, and a closed cross section is formed by the compressive load bearing frame member 31 and the bending load bearing frame member 33.

The bending load bearing frame member 33 has an upper ridge line 61 formed by the upper wall 51 and the sidewall 53 and a lower ridge line 62 formed by the lower wall 52 and the sidewall 53. The bending load bearing frame member 33 has a front end portion 33b disposed on a longitudinally central portion 31c of the compressive load bearing frame member 31 and is curved inwardly of the vehicle body toward the longitudinal centerline 20 (FIG. 2) of the vehicle body as extending from the front end portion 33b toward the rear end portion 33a (namely, as extending rearwardly of the vehicle body). Thus, the upper and lower ridge lines 61, 62 curve inwardly of the vehicle body toward the longitudinal centerline 20 (FIG. 2) as extending from the longitudinally central portion 31c of the compressive load bearing frame member 31 in a rearward direction of the vehicle body.

With this arrangement, a bending moment produced due to a load acting on the front end of the vehicle body in a direction toward the longitudinal centerline 20 (FIG. 2) of the vehicle body can be born or sustained mainly by the curved upper and lower ridge lines 61 and 62 of the bending load bearing frame member 33. Thus, the bending load bearing frame member may be also referred to as a moment receiving member that receives a bending moment.

Figure 10:
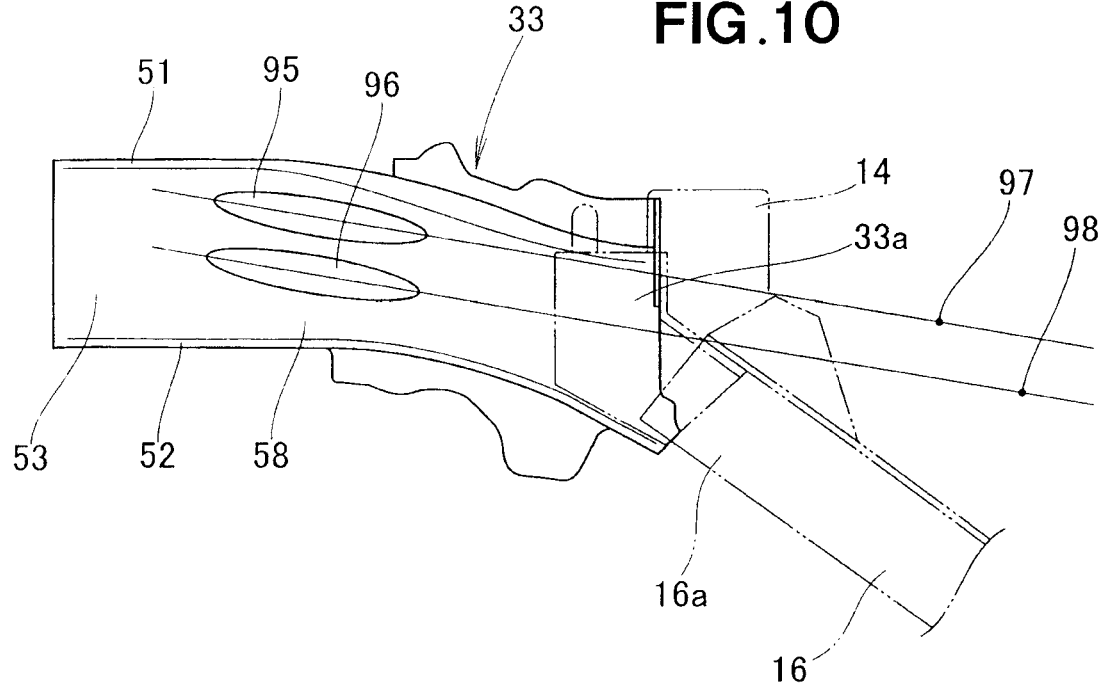
FIG. 10 is a view in the direction of the arrow 10 in FIG. 7.

As shown in FIG. 10 which is a view in the direction of the arrow 10 in FIG. 7, the upper inner reinforcement bead 95 is disposed on the sidewall 53 of the downwardly curved portion 58 adjacent to the upper wall 51 and formed to extend along an upper oblique line 97, which extends obliquely downward in a rearward direction of the vehicle body. The upper inner reinforcement bead 95 extends obliquely downward at a slight angle of inclination toward the front end portion 16a of the right floor frame 16. As shown in FIG. 5, the upper inner reinforcement bead 95 projects in a lateral outward direction which is opposite to a projecting direction of the upper reinforcement bead 48 of the compressive load bearing frame member 31.

The lower inner reinforcement bead 96 is disposed on the sidewall 53 of the downwardly curved portion 58 adjacent to the lower wall 52 and located directly below the upper inner reinforcement bead 96. The lower inner reinforcement bead 96 extends along a lower oblique line 98, which extends obliquely downward toward a rearward direction of the vehicle body. The lower oblique line 98 is parallel to the upper oblique line 97. The upper and lower inner reinforcement beads 95, 96 have an angle of inclination which is much smaller than angles of inclination of the first and third reinforcement beads 48, 49 and 76, 77. As shown in FIG. 5, the lower inner reinforcement bead 96 projects in the lateral outward direction which is opposite to a projecting direction of the lower reinforcement bead 49 of the compressive load bearing frame member 31. The pair of upper and lower inner reinforcement beads 95, 96 on the bending load bearing frame member 33 and the pair of upper and lower reinforcement beads 48, 49 on the compressive load bearing frame member 31 are arranged substantially face to face with each other.

By virtue of the upper and lower inner reinforcement beads 95, 96 provided on the downwardly curved portion 58 and extending in the longitudinal direction of the vehicle body, the bending load bearing frame member 33 is able to bear or sustain a bending moment M1 (FIG. 2) produced in the front side frame 11. The bending moment M1 shown in FIG. 2 is a moment, which is produced when the right front side frame 11 is subjected to a load F2 acting in a lateral inward direction toward the longitudinal centerline 20 of the vehicle body.

Furthermore, by virtue of the upper and lower inner reinforcement beads 95, 96, the bending load bearing frame member 33 is made highly rigid enough to sustain the bending moment M1 and hence is able to reduce an inwardly projecting amount S (FIG. 2) of the bending load bearing frame member 33, which is curved inwardly toward the longitudinal centerline 20 (FIG. 2) of the vehicle body as extending rearwardly of the vehicle body. By thus reducing the inwardly projecting amount S of the bending load bearing frame member 33, it is possible to enlarge an internal space 99 (FIG. 22) of the engine room, which will increase the degree of design freedom of the vehicle body front part structure 10. Reducing the inwardly projecting amount S directly brings about a reduction in weight of the front side frame 11.

Referring back to FIG. 3, the right floor frame 16 is disposed rearwardly of the right front side frame 11 and forms a skeletal member of a floor 27. The right floor frame 16 is connected at the front end portion 16a thereof to the rear end portion 11b of the right front side frame 11 via the right adapter 14 and extends rearwardly of the vehicle body from the rear end portion 11b of the right front side frame 11. The right floor frame 16 has a front portion 65 extending from the front end to a longitudinally central portion of the right floor frame 16, and a rear portion 66 extending from the longitudinally central portion to the rear end of the right floor frame 16. The front portion 56 has a downward slope in the rearward direction of the vehicle body, and the rear portion 57 is disposed substantially horizontally. An outrigger 67 extends to project from the front portion 65 in a direction laterally away from the longitudinal center line 20 (FIG. 2) of the vehicle body, and a cross-member attachment portion 68a extends to projects from the rear portion 66 in a direction toward the longitudinal centerline 20 (FIG. 20) of the vehicle body for attachment of a cross-member 68 (FIG. 2) to the floor frame 16.

Figure 11:
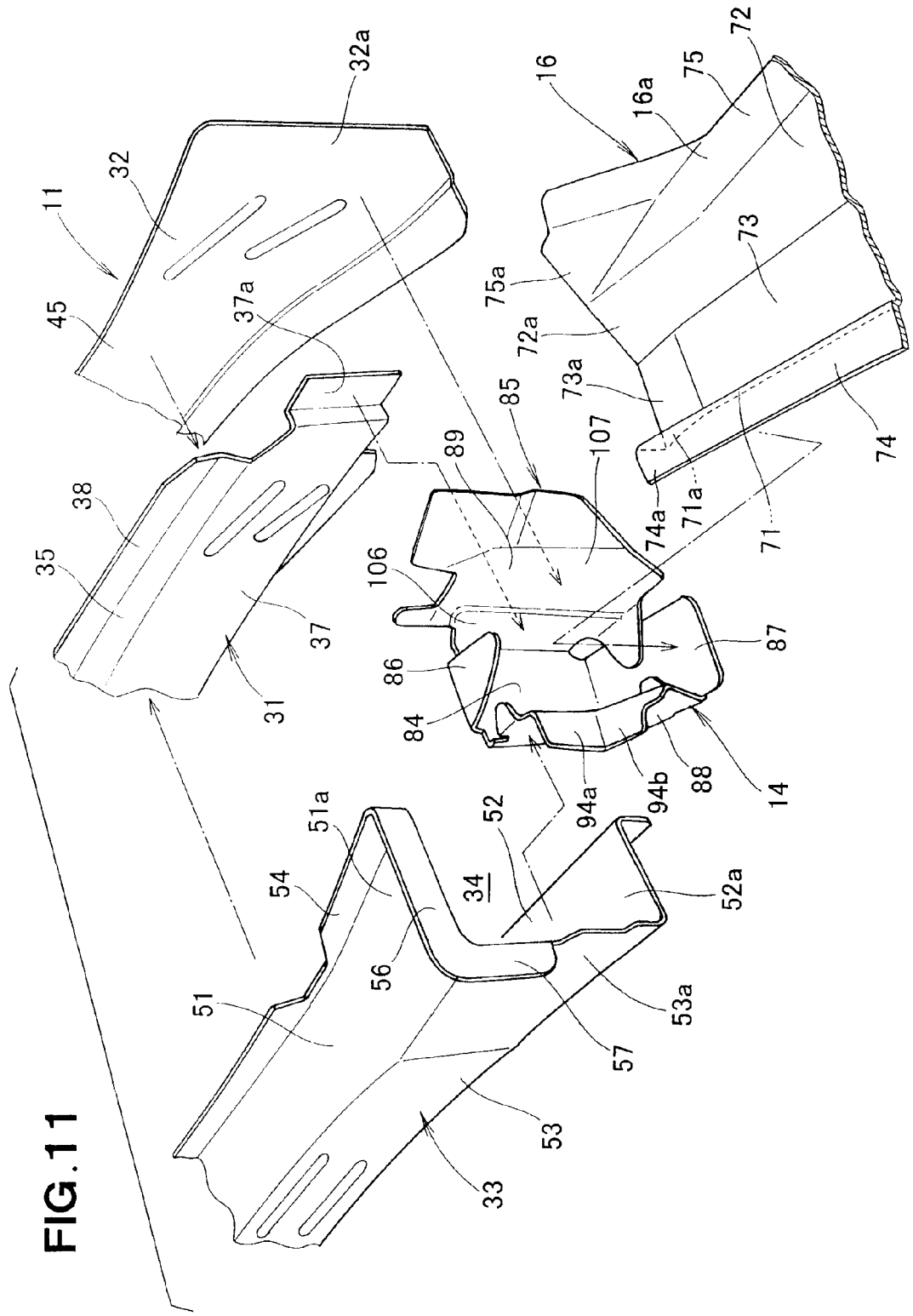
FIG. 11 is an enlarged exploded perspective view of a portion of FIG. 4.

As shown in FIG. 11 which is an enlarged perspective view of a portion of FIG. 4, the right floor frame 16 has a generally U-shaped cross section opening in an upward direction and includes an inner sidewall 71, an outer sidewall 72 and a bottom wall 73 extending between the inner and outer sidewalls 71, 72. The right floor frame 16 further has an inner flange 74 projecting from an upper longitudinal edge of the inner sidewall 71 in a lateral inward direction toward the longitudinal centerline 20 (FIG. 2) of the vehicle body, and an outer flange 75 projecting from an upper longitudinal edge of the outer sidewall 72 in a direction laterally away from the longitudinal centerline 20 (FIG. 2) of the vehicle body.

The outer flange 75 has a front end portion 75a bent into an appropriate shape so that the bent front end portion 75a can be welded to the right adapter 14. A dashboard 81 (FIG. 1) is placed on the inner and outer flanges 74, 75 along the front portion 65 of the right floor frame 16, and a floor panel 82 (FIG. 1) is placed on the inner and outer flanges 74, 75 along the rear portion 66 of the right floor frame 16.

The front end portion 16a of the right floor frame 16 is connected or joined to the rear end portion 11b (FIG. 3) of the right front side frame 11 via the right adapter 14. The right adapter 14 is press-formed from a single sheet metal into a desired configuration and includes a partition wall 84 partitioning the right front side frame 11 and the right floor frame 16, and a peripheral wall 85 extending continuously from a peripheral edge of the partition wall 84 in a direction perpendicular to the partition wall 84 and connected to the right front side frame 11 and the right floor frame 16.

The peripheral wall 85 of the right adapter 14 includes an upper joint portion 86 bent from an upper edge of the partition wall 84 in a rearward direction of the vehicle body, a lower joint portion 87 bent from a lower edge of the partition wall 84 in a rearward direction of the vehicle body, an inner joint portion 88 bent from an inner side edge of the partition wall 84 in a rearward direction of the vehicle body, and an outer joint portion 89 bent from an outer side edge of the partition wall 84 in a rearward direction of the vehicle body.

The upper joint portion 86 is joined by welding to a rear end portion 51a of the upper wall 51 of the bending load bearing frame member 33. The lower joint portion 87 is joined by welding to a rear end portion 52a of the lower wall 52 of the bending load bearing frame member 33 and a rear end portion 73a of the bottom wall 73 of the right floor frame 16. The inner joint portion 88 is joined by welding to a rear end portion 53a of the sidewall 53 of the bending load bearing frame member 33 and a front end portion 71a of the inner sidewall 71 of the right floor frame 16. The outer joint portion 89 is joined by welding to a rear end portion 37a of the sidewall 37 of the compressive load bearing frame member 31 and the rear end portion 32a of the cover frame member 32. The outer joint portion 89 is also joined by welding to a front end portion 72a of the outer sidewall 72 of the right floor frame 16.

Figure 12:
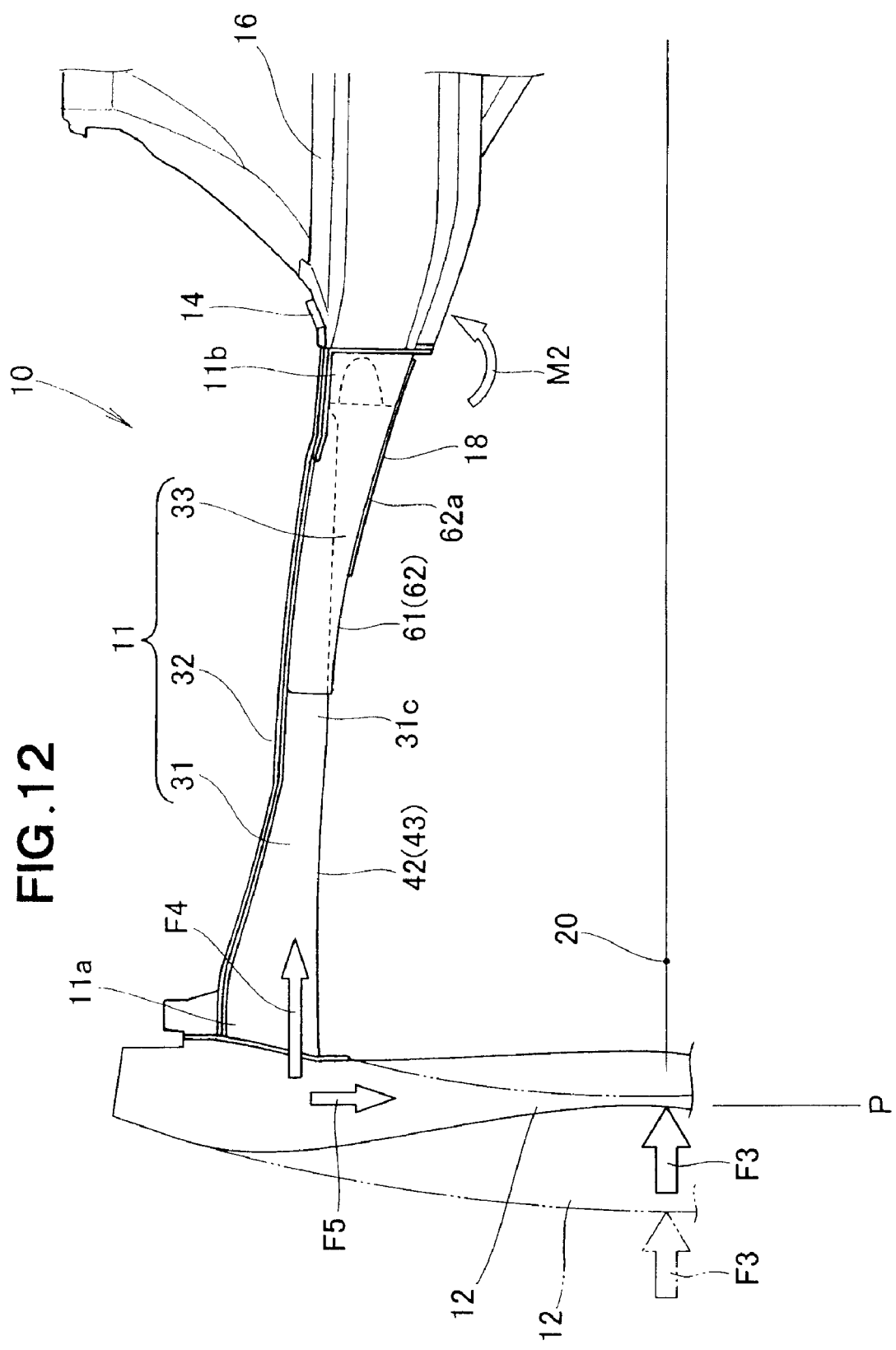
FIG. 12 is a diagrammatical view illustrative of the manner in which the vehicle body front part structure is subjected to a load acting from the front side of the vehicle body.

Operation of the vehicle body front part structure 10 of the foregoing construction will be described below with reference to FIG. 12. Upon front collision of the vehicle, an axial force of load F3 acts on the bumper beam 12 (indicated by phantom lines) as shown by a phantom-lined straight arrow. During the front collision, the bumper beam 12 yields backward to a rearward position P, as indicated by the solid lines shown in FIG. 12, under the effect of the axial load F3. The backward deformation of bumper beam 12 will produce a compressive load F4 and a bending load F5 acting via the bumper beam 12 to the front end portion 11a of the right front side frame 11.

The compressive load F4 is a load which tends to compress the right front side frame, and the bending load F5 is a load which tends to bend the right front side frame toward the longitudinal centerline 20 of the vehicle body. By the bending load F5 acting on the front end portion 11a of the right front side frame 11, a bending moment M2 is produced in the right front side frame 11 as shown by a curved arrow. In this instance, the compressive load F4 is born or sustained mainly by the upper and lower ridge lines 42, 43 of the compressive load bearing frame member 31. Since the upper and lower ridge lines 42, 43 extend in the longitudinal direction of the vehicle body and hence are able to reliably sustain the compressive load F4.

As described above with reference to FIG. 8, the compressive load bearing frame member 13 has the upper and lower reinforcement beads 48 and 49 and the upper and lower reinforcement beads 69 and 70 that are disposed forwardly of the reinforcement beads 48, 49. Furthermore, as explained previously with reference to FIG. 9, the cover frame member 32 has the upper and lower outer reinforcement beads 76 and 77. In an assembled condition, the compressive load bearing frame member 31 is reinforced by the cover frame member 32. With this reinforcement by the cover frame member 32, the compressive load bearing frame member 31 is able to sustain the compressive load F4 with improved reliability.

On the other hand, the bending moment M2 is born or sustained mainly by the upper and lower ridge lines 61 and 62 of the bending load bearing frame member 33. The upper and lower ridge lines 61, 62 are branched from the longitudinally central portion 31c of the bending load bearing frame member 33 and curved inwardly of the vehicle body toward the longitudinal centerline 20 of the vehicle body. With this configuration, the bending load bearing frame member 33 and more particularly the upper and lower ridge lines 61, 62 are able to sustain the bending moment M2 with sufficient reliability. As discussed above with reference to FIG. 10, the bending load bearing frame member 33 has the upper and lower inner reinforcement beads 95, 96 provided to increase the rigidity of the downwardly curved portion 58. With the inner reinforcement beads 95, 96 thus provided, the bending load bearing frame member 33 is able to sustain the bending moment M2 with improved reliability.

In the illustrated embodiment, the compressive load bearing frame member 31 and the bending load bearing frame member 30 are arranged to open in a lateral or widthwise outward direction of the vehicle body. The present invention should by no means be limited to the illustrated embodiment by may include a variation in which the compressive load bearing frame member 31 and the bending load bearing frame member 30 are arranged to open toward the longitudinal centerline 20 of the vehicle body.

Furthermore, although in the illustrated embodiment, the reinforcement beads 48, 49 on the compressive load bearing frame member 31 and the outer reinforcement beads 76, 77 of the cover frame member 32 are formed to project toward the longitudinal centerline 20 of the vehicle body, while the inner reinforcement beads 95, 96 on the bending load bearing frame member 33 are formed to project in a lateral or widthwise outward direction of the vehicle body, the projecting direction of each individual reinforcement bead may be selected as appropriate.

Obviously, various minor changes and modifications of the present invention are possible in light of the above teaching. It is therefore to be understood that within the scope of the appended claims the invention may be practiced otherwise than as specifically described.

What is claimed is:

1. A front part structure of a vehicle body having right and left front side frames, each of the front side frames comprising:
   a compressive load bearing frame member extending in a longitudinal direction of the vehicle body and having a generally U-shaped cross section opening in a lateral inward direction or a lateral outward direction of the vehicle body, the compressive load bearing frame member of the U-shaped cross section having upper and lower walls and a sidewall extending between the upper and lower walls;
   a bending load bearing frame member branched from a longitudinally central portion of the compressive load bearing frame member and curved inwardly toward a longitudinal centerline of the vehicle body as extending rearwardly of the vehicle body, the bending load bearing frame member having a generally U-shaped cross section opening in the lateral inward direction or the lateral outward direction of the vehicle body, wherein the compressive load bearing frame member has a rear end portion curved inwardly toward the longitudinal centerline of the vehicle body, and at least one first reinforcement bead formed on the sidewall of the rear end portion of the compressive load bearing frame member and extending in a longitudinal direction of the vehicle body; and
   a floor frame having a front end portion connected to a rear end portion of each of the front side frames, wherein the rear end portion of the compressive load bearing frame member is downwardly curved, and said at least one first reinforcement bead comprises upper and lower first reinforcement beads extending obliquely downward toward the front end portion of the floor frame and longitudinally aligned with upper and lower ends, respectively, of the front end portion of the floor frame.

2. The front part structure of the vehicle body according to claim 1, wherein the lower first reinforcement bead has an angle of inclination that is greater than an angle of inclination of the upper first reinforcement bead.

3. The front part structure of the vehicle body according to claim 1, wherein each of the front side frames further comprises a cover frame member connected to the compressive load bearing frame member so as to close an open end of the U-shaped cross section of the compressive load bearing frame member to thereby form a closed cross section between the cover frame member and the compressive load bearing frame member, and wherein the cover frame member has upper and lower third reinforcement beads arranged face to face with the upper and lower first reinforcement beads, respectively.

4. The front part structure of the vehicle body according to claim 1, wherein the bending load bearing frame member of the U-shaped cross section has upper and lower walls and a sidewall extending between the upper and lower walls, the bending load bearing frame member further having upper and lower fourth reinforcement beads formed on the sidewall thereof and extending in the longitudinal direction of the vehicle body.

5. The front part structure of the vehicle body according to claim 4, wherein the upper and lower first reinforcement beads and the upper and lower fourth reinforcement beads are arranged face to face with each other.

6. The front part structure of the vehicle body according to claim 3, wherein the bending load bearing frame member of the U-shaped cross section has upper and lower walls and a sidewall extending between the upper and lower walls, the bending load bearing frame member further having upper and lower fourth reinforcement beads formed on the sidewall thereof and extending in the longitudinal direction of the vehicle body.

7. The front part structure of the vehicle body according to claim 6, wherein the upper and lower first reinforcement beads and the upper and lower fourth reinforcement beads are arranged face to face with each other.

8. A front part structure of a vehicle body having right and left front side frames, each of the front side frames comprising:
   a compressive load bearing frame member extending in a longitudinal direction of the vehicle body and having a generally U-shaped cross section opening in a lateral inward direction or a lateral outward direction of the vehicle body, the compressive load bearing frame member of the U-shaped cross section having upper and lower walls and a sidewall extending between the upper and lower walls;
   a bending load bearing frame member branched from a longitudinally central portion of the compressive load bearing frame member and curved inwardly toward a longitudinal centerline of the vehicle body as extending rearwardly of the vehicle body, the bending load bearing frame member having a generally U-shaped cross section opening in the lateral inward direction or the lateral outward direction of the vehicle body, wherein the compressive load bearing frame member has a rear end portion curved inwardly toward the longitudinal centerline of the vehicle body, and at least one first reinforcement bead formed on the sidewall of the rear end portion of the compressive load bearing frame member and extending in a longitudinal direction of the vehicle body; and
   an adapter disposed on a rear end portion of each of the front side frames, and a floor frame having a front end portion connected via the adapter to the rear end portion of each of the front side frames.

9. A front part structure of a vehicle body having right and left front side frames, each of the front side frames comprising:
   a compressive load bearing frame member extending in a longitudinal direction of the vehicle body and having a generally U-shaped cross section opening in a lateral inward direction or a lateral outward direction of the vehicle body, the compressive load bearing frame member of the U-shaped cross section having upper and lower walls and a sidewall extending between the upper and lower walls;
   a bending load bearing frame member branched from a longitudinally central portion of the compressive load bearing frame member and curved inwardly toward a longitudinal centerline of the vehicle body as extending rearwardly of the vehicle body, the bending load bearing frame member having a generally U-shaped cross section opening in the lateral inward direction or the lateral outward direction of the vehicle body, wherein the compressive load bearing frame member has a rear end portion curved inwardly toward the longitudinal centerline of the vehicle body, and at least one first reinforcement bead formed on the sidewall of the rear end portion of the compressive load bearing frame member and extending in a longitudinal direction of the vehicle body; and
   a sub-frame disposed below the front side frames and connected to the front side frames, and a stiffener disposed on each of the front side frame for reinforce a portion of the front side frame to which the sub-frame is connected.

10. A front part structure of a vehicle body having right and left front side frames, each of the front side frames comprising:
    a compressive load bearing frame member extending in a longitudinal direction of the vehicle body and having a generally U-shaped cross section opening in a lateral inward direction or a lateral outward direction of the vehicle body, the compressive load bearing frame member of the U-shaped cross section having upper and lower walls and a sidewall extending between the upper and lower walls;
    a bending load bearing frame member branched from a longitudinally central portion of the compressive load bearing frame member and curved inwardly toward a longitudinal centerline of the vehicle body as extending rearwardly of the vehicle body, the bending load bearing frame member having a generally U-shaped cross section opening in the lateral inward direction or the lateral outward direction of the vehicle body, wherein the compressive load bearing frame member has a rear end portion curved inwardly toward the longitudinal centerline of the vehicle body, and at least one first reinforcement bead formed on the sidewall of the rear end portion of the compressive load bearing frame member and extending in a longitudinal direction of the vehicle body; and
    a floor frame having a front end portion connected to a rear end portion of each of the front side frames, the floor frame having a generally U-shaped cross section including a pair of sidewalls and a bottom wall extending between the sidewalls, wherein the sidewall of the compressive load bearing frame member has a rear end portion connected to a front end portion of one of the sidewalls of the floor frame for transmission of a load therefrom to said one sidewall, the bending load bearing frame member of the U-shaped cross section has upper and lower walls and a sidewall extending between the upper and lower walls, the sidewall of the bending load bearing frame member having a rear end portion connected to a front end portion of the other of the sidewalls of the floor frame for transmission of a load therefrom to the other sidewall, and the first reinforcement bead of the compressive load bearing frame member extending longitudinally toward said one sidewall of the floor frame.

11. The front part structure of the vehicle body according to claim 10, wherein the bending load bearing frame member has at least one reinforcement bead formed on the sidewall thereof and extending longitudinally toward the other sidewall of the floor frame.

* * * * *